E. J. FILLINGIM.
VEHICLE WHEEL.
APPLICATION FILED APR. 5, 1913.
1,111,145. Patented Sept. 22, 1914.
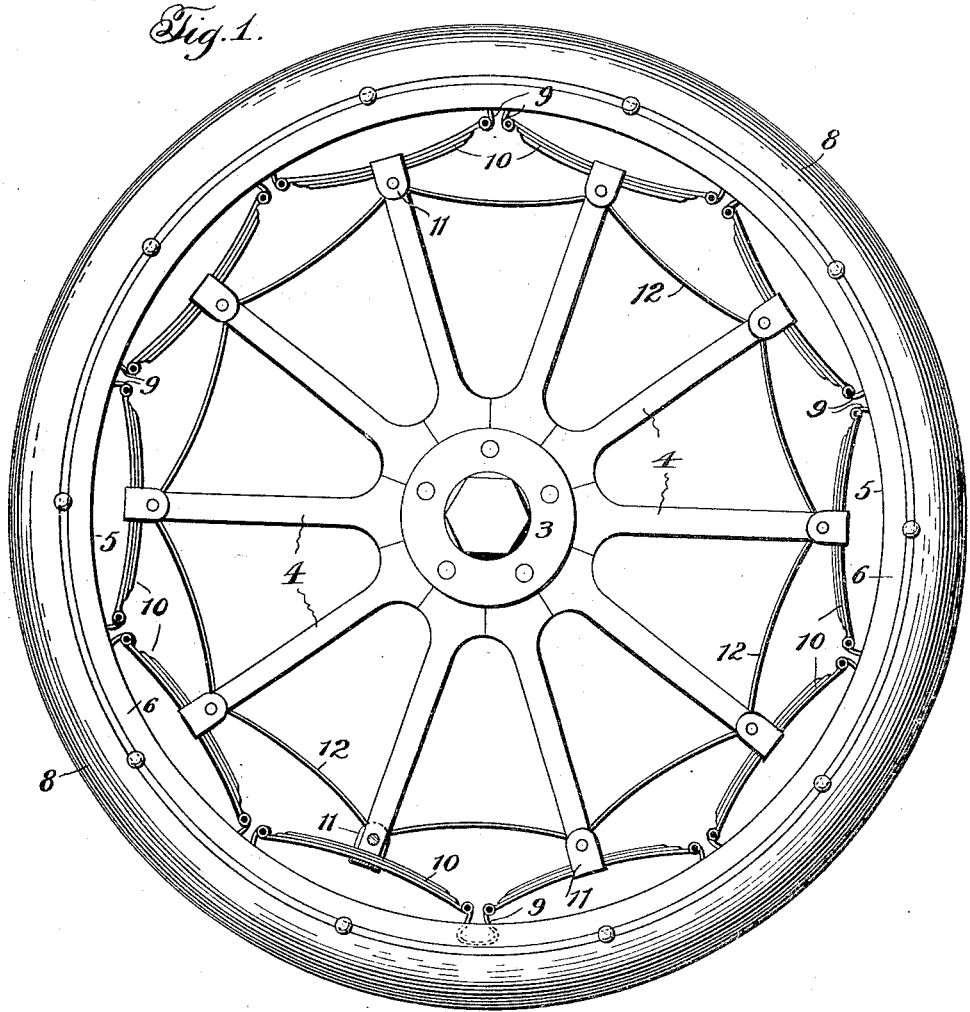
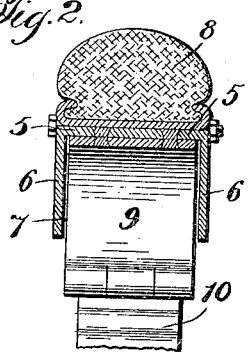

UNITED STATES PATENT OFFICE.

ELIJAH J. FILLINGIM, OF PACE, FLORIDA.

VEHICLE-WHEEL.

1,111,145.  Specification of Letters Patent.  Patented Sept. 22, 1914.

Application filed April 5, 1913. Serial No. 759,031.

*To all whom it may concern:*

Be it known that I, ELIJAH J. FILLINGIM, a citizen of the United States, residing at Pace, in the county of Santa Rosa and State of Florida, have invented certain new and useful Improvements in Vehicle-Wheels, of which the following is a specification, reference being had therein to the accompanying drawing.

This invention relates to resilient vehicle-wheels of the type in which springs are interposed between the spokes and the rim, and it is an object of the invention to provide a spring-wheel characterized by simplicity of construction and by resiliency to a satisfactory degree.

When read in connection with the description herein, the details of construction and arrangement of parts contemplated by the invention will be apparent from the accompanying drawing, forming part hereof, wherein an embodiment of the invention is disclosed, for purposes of illustration.

While the embodiment of the invention disclosed and described herein now is considered a preferable one, it is not the intention to be limited necessarily thereto in interpretation of claim hereinafter, as it is obvious that alterations can be made within the limits prescribed by the claim, without departing from the nature and spirit of the invention.

Like reference-characters refer to corresponding parts in the views of the drawing, of which—

Figure 1 is a plan view of a wheel having my invention embodied therein; and Fig. 2 is a transverse sectional view through the wheel-rim.

Having more particular reference to the drawing, 3 designates a hub and 4 spokes of a vehicle-wheel. A rim 5 of the wheel is formed with inwardly-extending side flanges 6, whereby an annular interior groove or channel 7 is formed. The rim has thereon any suitable tire 8, preferably of a resilient type.

Within the channel 7, and at regular intervals around the rim, are secured by riveting or otherwise, a series of U-shaped springs 9, the connection being at the cross portion of the springs, and the arms of the springs extending inwardly from the rim. There are the same number of such springs as spokes, and the springs are disposed preferably midway between the points of intersection with the rim of lines drawn longitudinally through and extending from the spokes. The springs 9 are about the width of the channel 7, and the flanges 6 form side braces for them.

Leaf-springs 10, one for every spoke, at their ends are pivotally connected to arms of the U-shaped springs, one end of every leaf-spring being connected to an arm of a U-shaped spring and the other end to an arm of a next adjacent U-shaped spring. Each leaf-spring is connected to a spoke by a strap 11 secured to the spoke, which strap envelops the spring so that the end of the spoke may bear against the spring.

Braces 12 extend from spoke to spoke and are connected to the spokes near their ends, in order that lateral strains to which one or more spokes may be subjected will be sustained by all spokes.

It will be seen that the springs 9 and 10 constitute resilient connections between the spokes and the rim and that weight imposed upon the wheel at the hub is sustained by the springs. When the springs at the lower portion of the wheel give under the influence of load, inequalities in the roadway, or otherwise, there is, of course, a relative movement of the spokes with relation to the rim. This movement is permitted by the resiliency of both kinds of springs at the top of the wheel and by lateral give of the U-shaped springs in the vicinity of the horizontal diameter of the wheel.

Having thus described my invention, what I claim as new, and desire to secure by Letters Patent, is—

A wheel comprising the combination of spokes, a rim having an inner annular channel, U-shaped springs secured to the rim in the channel and laterally braced by the sides of the channel, leaf-springs having the ends of the spokes bearing thereagainst intermediate their ends and said leaf-springs having their ends pivotally connected to arms of the U-shaped springs, on every spoke at its end a strap enveloping the leaf-spring against which the spoke bears, and braces extending from spoke to spoke and connected to the spokes near their ends.

Signed at Pace, in the county of Santa Rosa, and State of Florida, this 18 day of March, 1913.

ELIJAH J. FILLINGIM.

Witnesses:
H. H. FLEMING,
G. C. WARE.

Copies of this patent may be obtained for five cents each, by addressing the "Commissioner of Patents, Washington, D. C."